No. 616,036. Patented Dec. 13, 1898.
R. THOMPSON.
STEAM OR WATER COCK.
(Application filed Feb. 9, 1898.)

(No Model.)

WITNESSES
Ada Montague
Rosa Beech

INVENTOR
Richard Thompson
per Henry Beech
Attorney.

UNITED STATES PATENT OFFICE.

RICHARD THOMPSON, OF LONDON, CANADA, ASSIGNOR OF ONE-HALF TO JOHN YOUNG, OF SAME PLACE.

STEAM OR WATER COCK.

SPECIFICATION forming part of Letters Patent No. 616,036, dated December 13, 1898.

Application filed February 9, 1898. Serial No. 669,700. (No model.)

*To all whom it may concern:*

Be it known that I, RICHARD THOMPSON, a subject of the Queen of Great Britain, residing at London, in the county of Middlesex and Province of Ontario, Dominion of Canada, have invented certain new and useful Improvements in Steam or Water Cocks, (for which I have received Letters Patent in Belgium, No. 129,475, dated July 14, 1897, and in France, No. 269,168, dated July 29, 1897;) and I do hereby declare that the following is a full, clear, and exact description of the invention, which will enable others skilled in the art to which it appertains to make and use the same.

My invention relates to cylinder-cocks, compression-cocks, and steam and water cocks of all descriptions.

It consists of a metal body containing a cylindrical water or steam chamber surrounding or partially surrounding a hollow plunger into which the steam or water enters through orifices in the side when said plunger is pressed into the steam or water chamber and issues thence through the usual outlet or bib.

Figure 1:
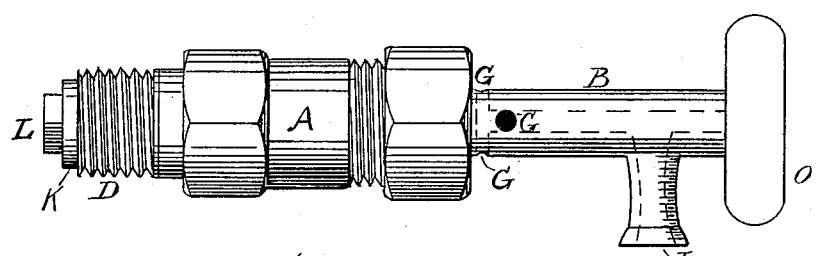
Figure 2:
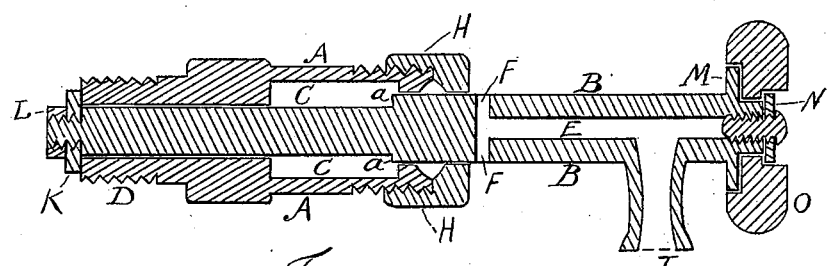
Figure 3:
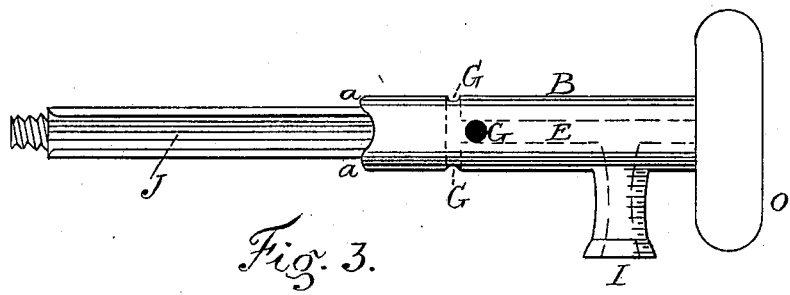

In the accompanying drawings of my invention, Figure 1 is an external view. Fig. 2 is a longitudinal section. Fig. 3 shows the plunger detached from the cock.

A is the body of the steam or water cock of any size and pattern.

B is the plunger, and C the steam or water chamber.

Steam or water enters the body of the cock through the shank D, which is screwed onto the supply-pipe or boiler, and passes into the portion forming the chamber C, which surrounds the plunger B. This plunger is hollow for a portion of its length, having a channel E formed in it, as shown at Fig. 2, (where it is seen in longitudinal section,) and another smaller channel or channels F at right angles, more or less, to the longitudinal one E. These smaller channels F terminate in external orifices G. When the plunger is pressed into the body of the cock by hand or any suitable form of lever attached thereto, the orifices G of cross-channels F pass beyond the stuffing-box H (which closes the outer end of the body) and into the steam or water chamber C, allowing the steam or water to enter the orifices G and so pass by channels F into main channel E, and thence to flow out by any form of outlet or bib I. The steam or water continues to pass out until the plunger is allowed to resume its normal position, when the orifices G will be all external to the stuffing-box H, and thus all communication with the chamber C is cut off.

Longitudinal grooves J are formed in the shank end of the plunger B to facilitate the entrance of steam or water into the chamber C as soon as the plunger is forced inward by hand or any manner of lever attachment. At all other times the shank end of the body is closed against the entrance of steam or water by covering plate or valve K, which is secured by nut L to the shank of the plunger. This is a simple but effective mechanism for instantaneously closing and shutting off the flow, which otherwise is continuous.

It is the pressure of the flow against the shoulder $a$ of the plunger B which keeps the plunger outward normally and retains it there until the lever or hand pressure is brought to bear upon it, so as to press the plunger back into the body of the cock, as already described. In case the pressure should be found insufficient to force the plunger outward it may be aided by a coil-spring surrounding a portion of the shank end of the plunger.

One of the advantages of the above-described form of construction is its facility for cleaning. The channel E is continuous and straight from the outer end of stuffing-box to end of the plunger, continuing beyond the bib I until the end of it is closed by a plate M and nut N, contained in or covered by the knob O on the end of the plunger. This allows of a wire or cane being passed through the channel E to remove any obstruction while the pressure is still on, the orifices G being then external to the stuffing-box. The cross-channels F may be similarly cleaned and unstopped through their orifices. The arrangement of these orifices (of which there will usually be four, but the number may be more or less) places them at different distances from the outer end of the stuffing-box H. This is in the highest degree material, as it produces not only a greater smoothness of current and prevents all jar when shutting off, but constitutes a mode of regulating the flow from a small and almost invisible current to a full current, according as one or more of the orifices G are made to enter the steam or water chamber, by pressing the plunger more or less in. It is a mode of regulating the flow so as to make it fast or slow at will and is capable of any amount of variation by increasing or lessening the number of the cross-channels F (with their orifices G) which communicate with the main channel E. The prevention of jar in shutting off (hereinbefore mentioned) is the natural and inevitable result of the gradual closing of the flow of water when effected by the use of several orifices instead of one. Instead of the flow being stopped suddenly, causing a violent back push of the fluid in the chamber C, and hence a jarring sound and strain, the flow is diminished step by step, so to speak, and so gradually that no jar results.

Having thus described my invention, what I claim, and desire to secure by Letters Patent, is—

1. In a steam or water cock, the combination of the body A, the steam or water chamber C within said body, the plunger B, partially surrounded by said chamber, the continuous channel E extending longitudinally, through part of the center of said plunger, in a straight line to the handle end of the same, at which there is an orifice, normally closed, but adapted to be opened to facilitate cleaning said channel, which is provided with an outlet I at right angles to itself, and the transverse channels F, terminating in orifices G and intersecting at right angles the channel E, one of said transverse channels being located behind the other so as not to intersect it, said channels being adapted to allow the escape of steam or water from the chamber C into the channel E when said plunger is pressed inward, and to communicate directly with the outer air when the plunger is withdrawn, substantially as set forth.

2. In a steam or water cock, the combination of the hollow body A, plunger B in said body, channel E in said plunger, terminating in an orifice at the extreme handle end, plate M, and nut N, adapted to close said orifice and knob O containing said plate and nut substantially as set forth.

RICHARD THOMPSON.

Witnesses:
  HENRY BEECH,
  JOEL BENNETT.